May 5, 1970 F. STERZER 3,510,805

IMPEDANCE CONTROL USING TRANSFERRED ELECTRON DIODES

Filed Dec. 20, 1968 2 Sheets-Sheet 1

INVENTOR

Fred Sterzer

BY Edward J. Norton

ATTORNEY

INVENTOR
Fred Sterzer
BY Edward J Norton
ATTORNEY

United States Patent Office 3,510,805
Patented May 5, 1970

3,510,805
IMPEDANCE CONTROL USING TRANSFERRED ELECTRON DIODES

Fred Sterzer, Princeton, N.J., assignor to RCA Corporation, a corporation of Delaware Filed Dec. 20, 1968, Ser. No. 785,504
Int. Cl. H01p *5/12, 1/26, 1/10*
U.S. Cl. 333—7 6 Claims

ABSTRACT OF THE DISCLOSURE

A controllable impedance device using a transferred electron diode of the type whose operation depends on the transfer of electrons heated by electric fields from high mobility to low mobility sub-bands is provided.

The invention herein described was made in the course of or under a contract or subcontract thereunder with the Department of the Army.

BACKGROUND OF THE INVENTION

This invention relates to an impedance control device and more particularly to the use of transferred electron diodes as a controllable impedance device.

The term transferred electron diode refers to that type of diode whose operation depends on transfer of electrons heated by electric fields from high mobility to low mobility sub-bands. These diodes are now being used in microwave oscillators, amplifiers and mixers. For a more complete understanding of the operation of these diodes, refer to IEEE Transactions on Electron Devices, special issues on Semiconductor Bulk Effect and Transit-Time Devices, vol. ed. 13, January 1966, and vol. 14, September 1967.

Other types of diodes such as PIN diodes have been used as controllable impedance elements such that the diodes act merely to pass or reflect RF energy. It is therefore desirable to find a new type of controllable impedance device that reflects and absorbs the RF energy and which can be biased by lower control voltages.

It is an object of the present invention to provide for use with a transmission line an improved controllable impedance means that both absorbs and reflects RF signal energy depending on a suitable control signal applied to the controllable impedance means.

It is another object of the present invention to provide an improved RF attenuator, RF switch or an amplitude modulator by the use of transferred electron diodes.

Briefly, a transferred electron diode is connected as a controllable impedance device across a transmission line. The diode is constructed to have a doping density times the length or thickness of the active region of the diode which is made small so as to stabilize the diode and so that the impedance presented by the diode in one voltage state is equal to the impedance of the transmission line.

DESCRIPTION OF THE PREFERRED EMBODIMENT

A preferred embodiment of the present invention is described with the aid of the accompanying drawing wherein.

Figure 1:
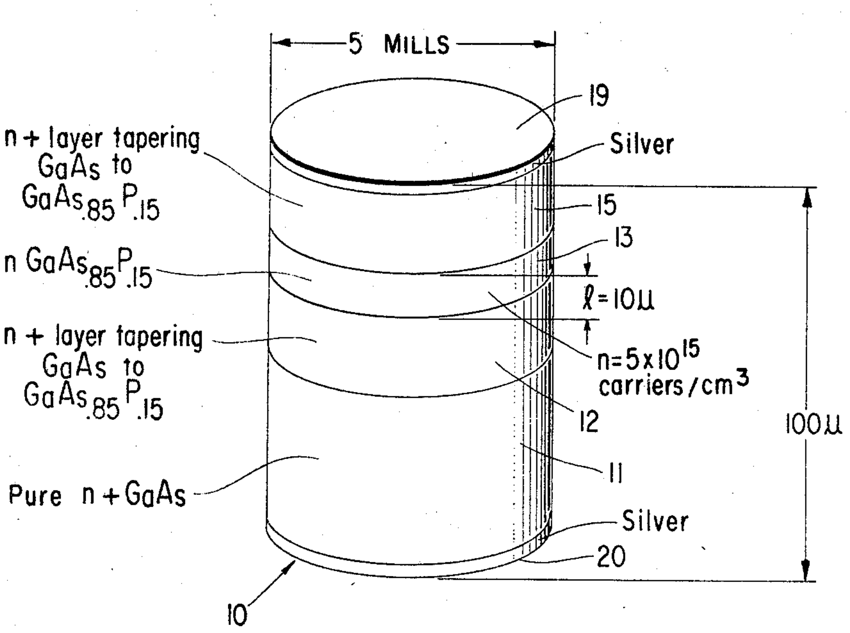
FIG. 1 is a perspective view of a transferred electron diode of the type used in the present invention.

Referring to FIG. 1, there is illustrated a transferred electron diode 10 having an active region of N type gallium arsenide and phosphide ($GaAs_xP_{1-x}$). The transferred electron diode 10 is a 5 mil diameter mesa chemically etched from epitaxial N+–N–N+ gallium arsenide and phosphide ($GaAs_xP_{1-x}$) sandwiches grown by the vapor hydride synthesis technique described by Tietjen and Amick, "Preparation and Properties of Vapor Deposited Epitaxial $GaAs_{1-x}GaP_x$ Using Arsine and Phosphine," Journal of Electro Chemical Society, vol. 113, pp. 724–728, July 1966. The first region 11 of the diode 10 is pure N+ gallium arsenide (GaAs) from which the mesa developed. The second region 12 and last region 15 act as matching regions and are N+ layers tapering from pure gallium arsenide (GaAs) to a mixture near region 13 of gallium arsenide and phosphide ($GaAs_{.85}P_{.15}$). The region 13 is the active region of the gallium arsenide and phosphide mixture $GaAs_{.85}P_{.15}$, and is made in this example approximately 10 microns thick. The carrier density in the active region 13 of such material is estimated to be about $5\times10^{15}$ carriers per centimeter$^3$. A coating of silver is placed on either end of the diode 10 providing electrons 10 and 20.

Figure 2:
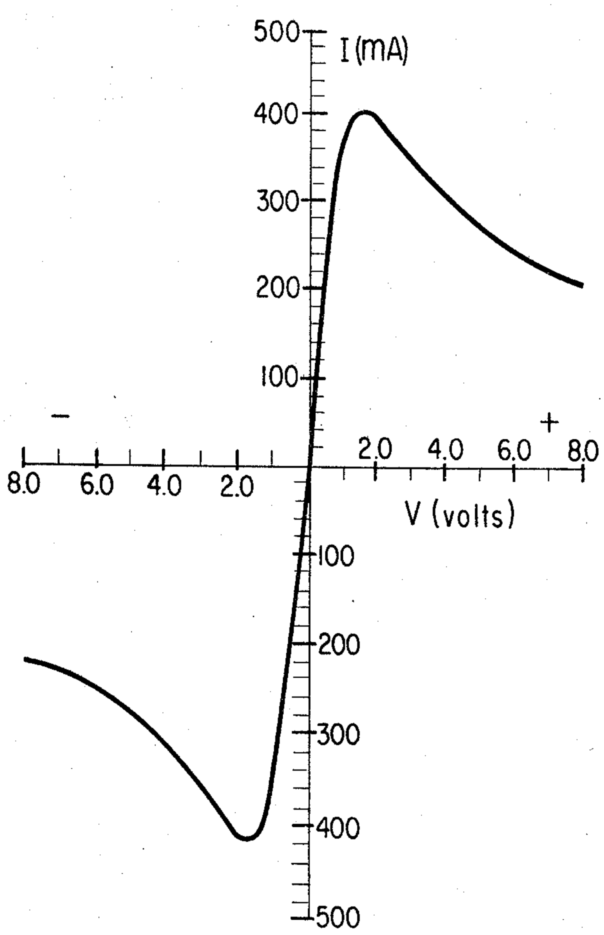
FIG. 2 is a curve illustrating a typical static current-voltage characteristic for a diode like that shown in FIG. 1.

FIG. 2 shows a typical static current voltage characteristic for a diode as described above. It can be seen from FIG. 2 that the I–V characteristics are antisymmetric about the origin, and that the currents reach a maximum at voltages of approximately ±1.5 volts, and that at voltages greater than 1.5 volts or more negative than minus 1.5 volts, the diodes exhibit a static negative resistance. By making the $nl$ product of carrier density ($n$) and length or thickness ($l$) small, on the order of that described ($5\times10^{12}$ per cm.$^2$) or less, these diodes can be stabilized when this type of diode is biased at voltages where the average electric field in the active region of the diode exceeds the critical field, where the critical field is defined as the field above which the differential mobility of the charge carriers becomes negative.

Figure 3:
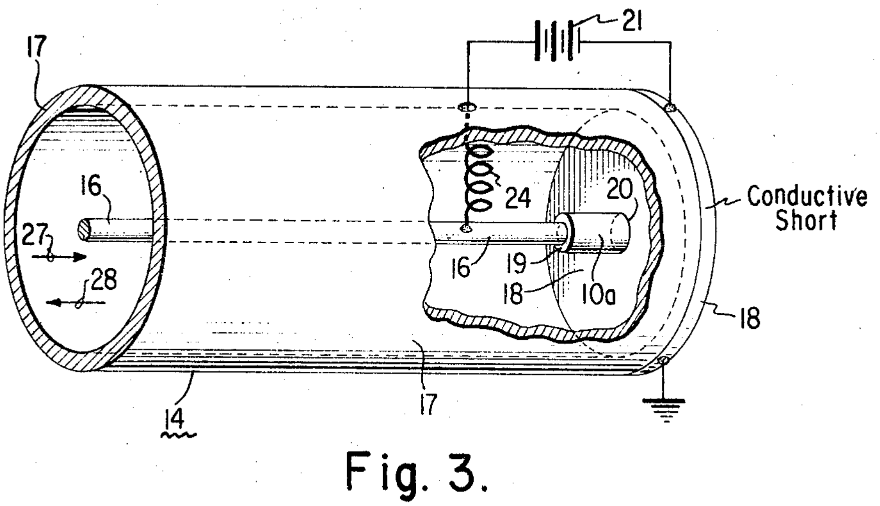
FIG. 3 is a perspective view of a diode like that shown in FIG. 1 coupled across a coaxial transmission line.

FIG. 3 shows the placement of a transferred electron diode like that described above in a section of coaxial transmission line 14 having an inner conductor 16 and outer conductor 17. The coaxial transmission line 14 is shorted at one end by conductor 18 which covers the entire area across one end of the transmission line 14. The diode 10*a* is coupled so that one electrode 19 is connected to inner conductor 16 and the other electrode 20 is connected to conductive short 18. The diode is biased to conduct by coupling one side of the voltage source 21 through RF choke coil 24 to inner conductor 16 and coupling the other side to the outer conductor 17 at ground or reference potential as shown in FIG. 3. In the construction of the diode 10*a*, the cross sectional area of the diode that is transverse to the direction in which the diode conducts (in the case of a cylindrical diode, the area determined by the diameter of the diode) is selected and the length of the active region of the diode is selected so that the diode when biased at the high voltage state conducts and presents in the line an impedance which matches the characteristic impedance of the transmission line. In the example of FIG. 1, wherein the diameter of the diode is 5 mils, the cross sectional area of the diode is $$(5\times 5)\frac{\pi}{4}\text{ mils}^2$$

and the length of the active region of the line is 10 microns. This 5 mil diameter diode as shown and described in connection with FIG. 1 when placed in a 50 ohm transmission line as shown in FIG. 3 and biased at about 4 volts presents an impedance in the line which matches the 50 ohm coaxial transmission line. Thus, when the diode 10*a* is biased at a low voltage state, below 0.9 volt, for example, RF signals in the coaxial line traveling in the direction 27 toward the diode are reflected back away from the diode in the direction 28 due to the impedance mismatch across the diode 10*a*. When the diode is biased in the high voltage state, 4 volts, for example, the diode conducts between the electrodes 19 and 20 and provides an impedance match to the coaxial line and the RF signal in the coaxial line traveling in the direction 27 is absorbed by the diode 10*a*.

Figures 4, 5:
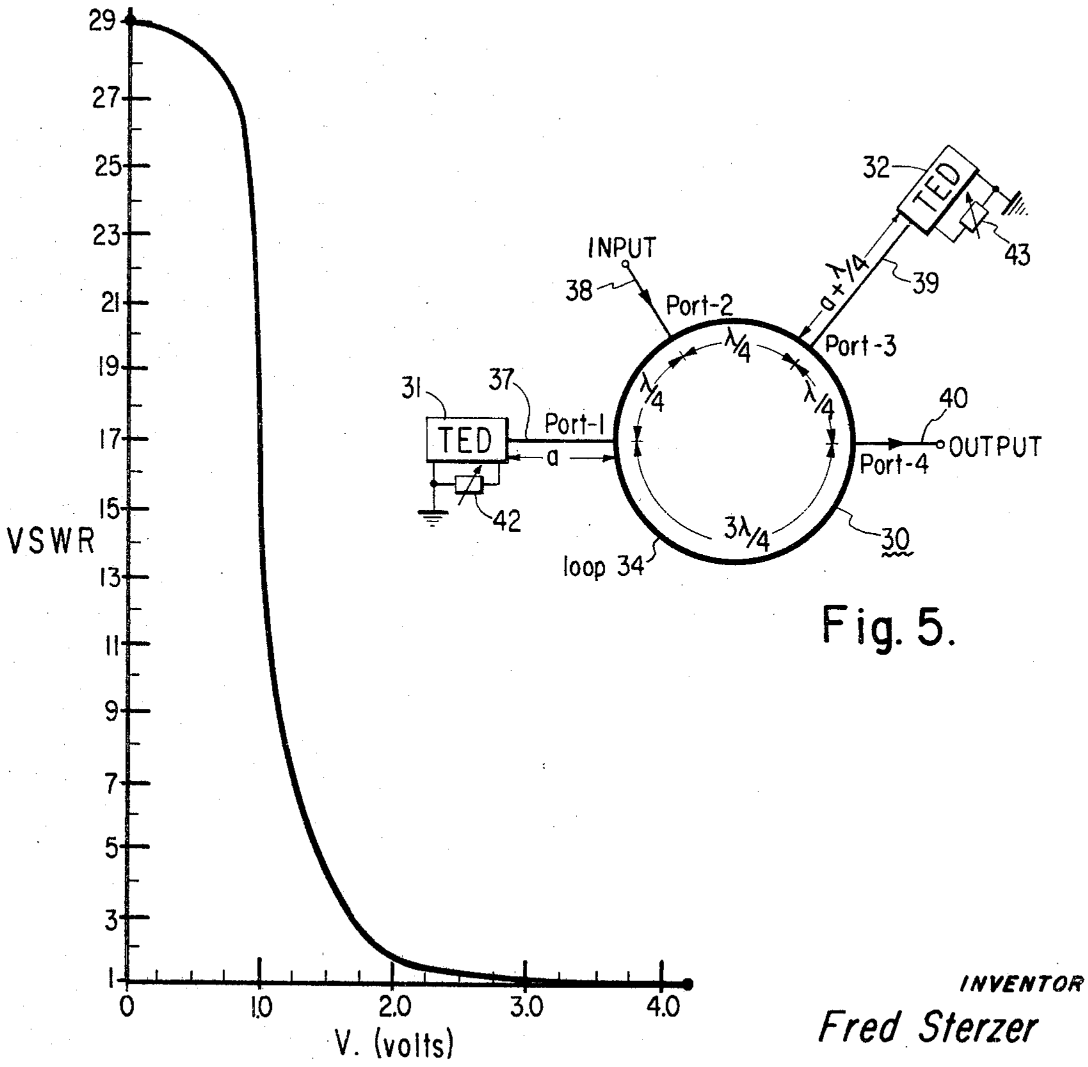
FIG. 4 is a plot of the voltage standing wave ratio at 900 MHz. of a transferred electron diode coupled into a coaxial transmission line like that shown in FIG. 3 as a function of D.C. bias voltage applied to that diode.
FIG. 5 is a schematic diagram of a controlled impedance device using two transferred electron diodes with a hybrid ring.

FIG. 4 shows the standing wave ratio (VSWR) of a diode coupled like that described above when operating at a frequency of 900 megahertz with the diode terminating a 50 ohm line. For a biasing voltage below 0.9 volt, the VSWR is quite high since the static resistance of the diode as shown in FIG. 2 for low voltage is about 2 ohms. For voltages above 1 volt, the VSWR decreases with increasing voltage and becomes near unity at a voltage of 4 volts which is the point where the diode impedance acting in the line matches the line impedance of 50 ohms. By controlling the bias voltage, a diode of the type described above when placed across a transmission line can be used to modulate a signal as well as to switch or attenuate a signal appied to the transmission line.

Turning now to FIG. 5, there is shown an RF microwave variable attenuator 30 including two of the above described transferred electron diodes 31 and 32 used with a hybrid ring 33 having four ports. The hybrid ring 33 is made up of a transmission line closed loop 34 and four branches 37, 38, 39 and 40 extending from the respective ports 1, 2, 3 and 4 in the loop of the ring. The transmission line which makes up the loop 34 and the branches may be, for example, a coaxial transmission line and the diodes 31 and 32 are coupled across branches 37 and 39 respectively in the same manner as diode 10*a* in FIG. 3. Variable voltage sources 42 and 43 are each coupled across the diodes 31 and 32 respectively in the same manner as voltage source 21 in FIG. 3. The distance on the loop 34 between port 1 and input port 2 of the hybrid is ¼ of a wavelength ($\lambda/4$) at the operating frequency. Port 4 is located ¾ of a wavelength ($3\lambda/4$) on the loop 34 from port 1. Input port 2 is located ¼ wavelength ($\lambda/4$) on the loop 34 from port 3. Port 3 is located ¼ wavelength ($\lambda/4$) on loop 34 from port 4. The first transferred electron diode 31 is coupled across branch line 37 in the manner shown in FIG. 3 at a distance *a* from loop 34. A second transferred electron diode 32 is coupled across branch line 39 in the manner shown in FIG. 3 at a distance *a* plus one quarter wavelength at the operating frequency ($a+\lambda/4$).

In the operation of the above described embodiment, the signal to be either attenuated or modulated is introduced into the port 2 of the hybrid through branch line 38 and splits equally between the two arms, one going from port 2 to port 1 and the other going from port 2 to port 3. The transferred electron diode 31 at port 1 is located the distance *a* from port 1 of the loop 34 of the ring. The second transferred electron diode 32 is placed at the distance $a+¼$ wavelength at the operating frequency from the port 3 of the hybrid. The input signal at branch 39 has to travel an additional ¼ wavelength to reach the diode 32 as compared to the signal path including diode 31. The signal reflected from the second diode 32 also has to travel an additional ¼ wavelength to return to the loop 34 of the hybrid ring. These signals reach the hybrid loop 180° out of phase, and therefore since the signal at port 1 travels ¾ wavelength to port 4 and the signal at port 3 travels ¼ wavelength, these signals add up and leave at port 4 by way of branch 40. If the diodes 31 and 32 are biased at zero bias providing for the reflection of the input signals from the respective diodes, the arrangement would have an insertion loss on the order of about 0.6 db between input port 2 and output port 4. Upon the application of a bias voltage, for example, 4 volts, to the diodes 31 and 32 by sources 42 and 43, the diodes present to an impedance match to the transmission lines connecting them to the hybrid ring and absorb the RF energy. The insertion loss of the arrangement will increase, whereby at about 4 volts, practically all the RF energy is absorbed by the diodes 31, 32 providing a total insertion loss for the hybrid ring on the order of 30 db. It can therefore be seen that by operating between 0 volt bias and 4 volts bias in the example given, amplitude modulation or variable attenuation of the signal may be provided. A simple switch may likewise be provided.

What is claimed is:

1. A controllable impedance device for use with a transmission line having a given characteristic impedance comprising,

- a transferred electron semiconductor diode,
- means for coupling said diode across said transmisison line,
- said diode having an active region wherein the product of the doping density times the thickness of said region is determined with the construction of said diode to cause said diode to present a reflective mismatch in said line upon the application of a ocntrol signal of a first level to said diode and to present an absorptive matching impedance to said line upon the application of said control signal at a second higher level to said diode, and
- means for applying said control signal to said diode.

2. The combination as claimed in claim 1 wherein said control signal is variable between said first and second level.

3. The combination as claimed in claim 1 wherein said transmission line is a coaxial transmission line having an inner and outer conductor and said diode is coupled between said inner and outer conductor.

4. The combination as claimed in claim 3 wherein said coaxial transmission line has a conductive short entirely across said line and said diode is coupled between said inner conductor and said short.

5. In combination,

- a hybrid coupler of the type characterized by a loop of transmission line having an input branch, an output branch, and first and second control branches coupled to the loop and extending from said loop, said input branch being arranged for coupling signals at a given operating frequency to said loop and said output branch being arranged to couple said signals out of said loop, said transmission line loop and branches having a given characteristic impedance,
- a first transferred electron diode device coupled a given distance from said loop across said first control branch,
- a second transferred electron diode device coupled said given distance plus one-quarter wavelength at said frequency from said loop across said second control branch,
- said first control branch and said output branch being at diametrically opposite points of said loop, and each of the other branches being at a point on the order of one-quarter of a wavelength at said operating frequency from the next adjacent branch, and
- means coupled to said first and second transferred electron diodes for providing at one voltage state sufficient bias to said diodes to cause said diodes to present a reflective mismatch in said respective control branches and at a second voltage stage an absorptive matching impedance in said respetcive control branches.

6. The combination as claimed in claim 5 and wherein said bias means is variable between said first and second states.

References Cited

UNITED STATES PATENTS

| | | | |
|---|---|---|---|
| 3,245,014 | 4/1966 | Plutchok et al. | 333—7 X |
| 3,452,299 | 6/1969 | Angel | 333—7 |

HERMAN KARL SAALBACH, Primary Examiner

M. NUSSBAUM, Assistant Examiner

U.S. Cl. X.R.

307—323; 317—234; 333—11, 22